US010099388B1

(12) United States Patent
Kozlowski et al.

(10) Patent No.: US 10,099,388 B1
(45) Date of Patent: Oct. 16, 2018

(54) ROBOTIC FINGER ASSEMBLIES

(71) Applicant: TELEFACTOR ROBOTICS LLC, West Conshohocken, PA (US)

(72) Inventors: Matthew V. Kozlowski, Catonsville, MD (US); Stuart D. Harshbarger, Woodbine, MD (US); Matthew S. Johannes, Catonsville, MD (US)

(73) Assignee: Telefactor Robotics LLC, West Conshohocken, PA (US)

( * ) Notice: Subject to any disclaimer, the term of this patent is extended or adjusted under 35 U.S.C. 154(b) by 0 days.

(21) Appl. No.: 15/294,393

(22) Filed: Oct. 14, 2016

Related U.S. Application Data

(60) Division of application No. 14/599,321, filed on Jan. 16, 2015, now Pat. No. 9,469,036, which is a continuation of application No. 13/427,770, filed on Mar. 22, 2012, now Pat. No. 8,936,289, which is a continuation-in-part of application No. 13/048,724, filed on Mar. 15, 2011, now abandoned.

(60) Provisional application No. 61/466,391, filed on Mar. 22, 2011, provisional application No. 61/314,036, filed on Mar. 15, 2010.

(51) Int. Cl.
*B25J 15/08* (2006.01)
*B25J 15/10* (2006.01)

(52) U.S. Cl.
CPC ............ *B25J 15/10* (2013.01); *Y10S 901/36* (2013.01)

(58) Field of Classification Search
CPC .................................. B25J 15/10; B25J 15/08

USPC ......... 294/106, 111; 901/25, 39, 45; 623/63, 623/64; 414/5, 6, 7
See application file for complete search history.

(56) References Cited

U.S. PATENT DOCUMENTS

| | | | |
|---|---|---|---|
| 3,509,583 A | 5/1970 | Fraioli | |
| 4,351,553 A * | 9/1982 | Rovetta | B25J 15/0009 294/106 |
| 4,533,167 A | 8/1985 | Johnson | |
| 4,623,183 A * | 11/1986 | Aomori | B25J 15/103 294/106 |
| 4,680,523 A | 7/1987 | Goumas | |
| 4,818,173 A | 4/1989 | Khusro | |
| 4,818,174 A | 4/1989 | Arpiarian | |
| 4,921,293 A * | 5/1990 | Ruoff | A61F 2/583 294/106 |
| 4,957,320 A | 9/1990 | Ulrich | |
| 5,062,673 A | 11/1991 | Mimura | |
| 5,378,033 A * | 1/1995 | Guo | A61F 2/583 294/115 |
| 5,437,490 A | 8/1995 | Mimura et al. | |
| 5,784,542 A * | 7/1998 | Ohm | B25J 3/04 700/247 |
| 7,168,748 B2 * | 1/2007 | Townsend | B25J 9/1612 294/106 |
| 8,052,857 B2 | 11/2011 | Townsend | |
| 9,073,208 B2 * | 7/2015 | Chung | B25J 9/1612 |
| 2003/0090115 A1 | 5/2003 | Kim | |

(Continued)

*Primary Examiner* — Paul T Chin
(74) *Attorney, Agent, or Firm* — Christensen O'Connor Johnson Kindness PLLC

(57) ABSTRACT

A robotic compliant jaw gripper includes one or more fingers, wherein each finger comprises a plurality of phalanges configured to grasp an object, wherein an internal compliant element is compressed, or wherein a proximal phalange contacts a compliant element as the finger applies pressure against the object; and a preload unit is configured to change the durometer of the compressible element.

4 Claims, 19 Drawing Sheets

(56) References Cited

U.S. PATENT DOCUMENTS

| | | |
|---|---|---|
| 2009/0025502 A1* | 1/2009 | Nakamoto .............. B25J 9/104 |
| | | 74/490.01 |
| 2011/0144770 A1 | 6/2011 | Moyer |
| 2012/0068486 A1 | 3/2012 | Kim et al. |
| 2012/0112485 A1 | 5/2012 | Lee et al. |
| 2013/0057004 A1 | 3/2013 | Murata et al. |
| 2014/0197652 A1 | 7/2014 | Wang et al. |

* cited by examiner

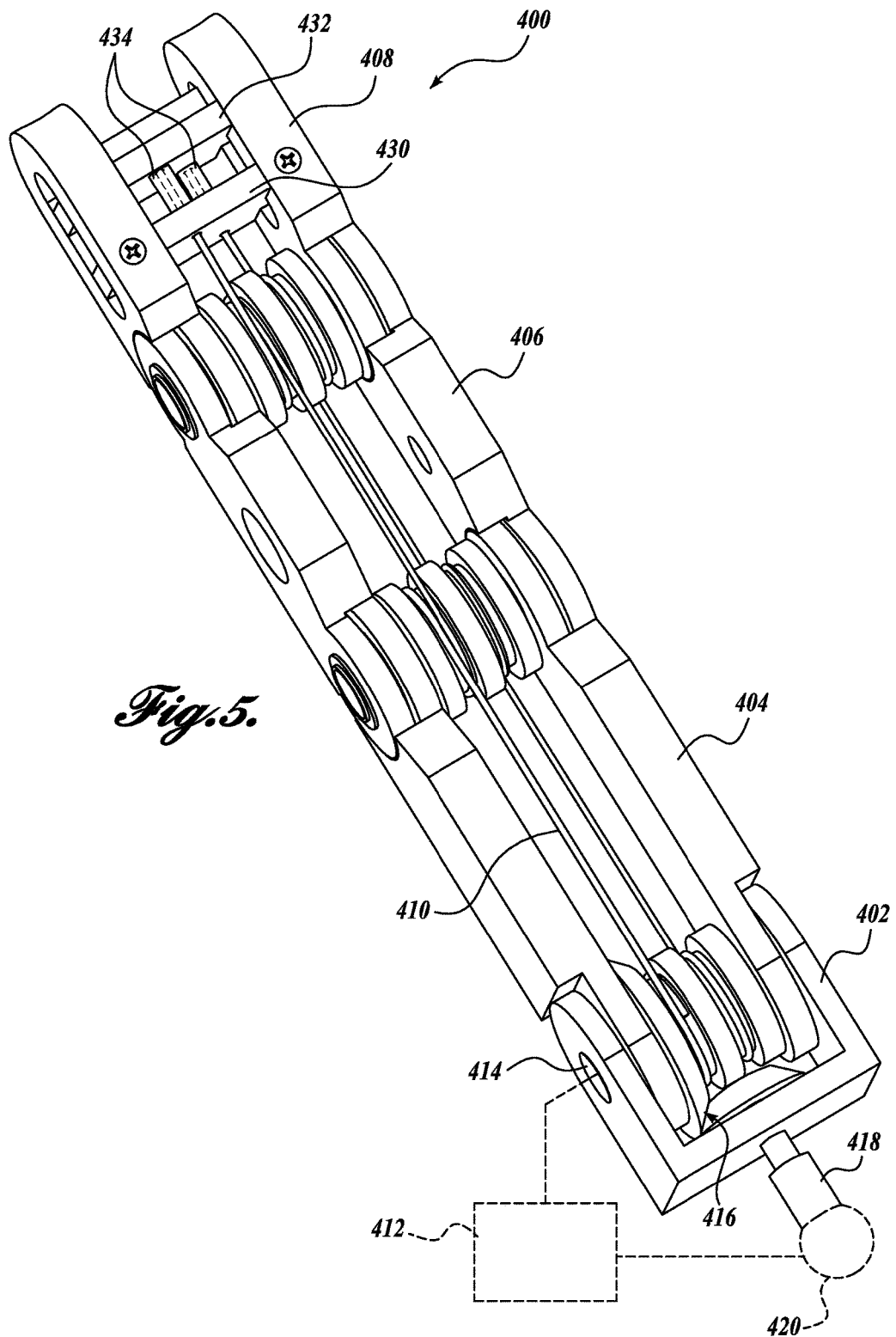

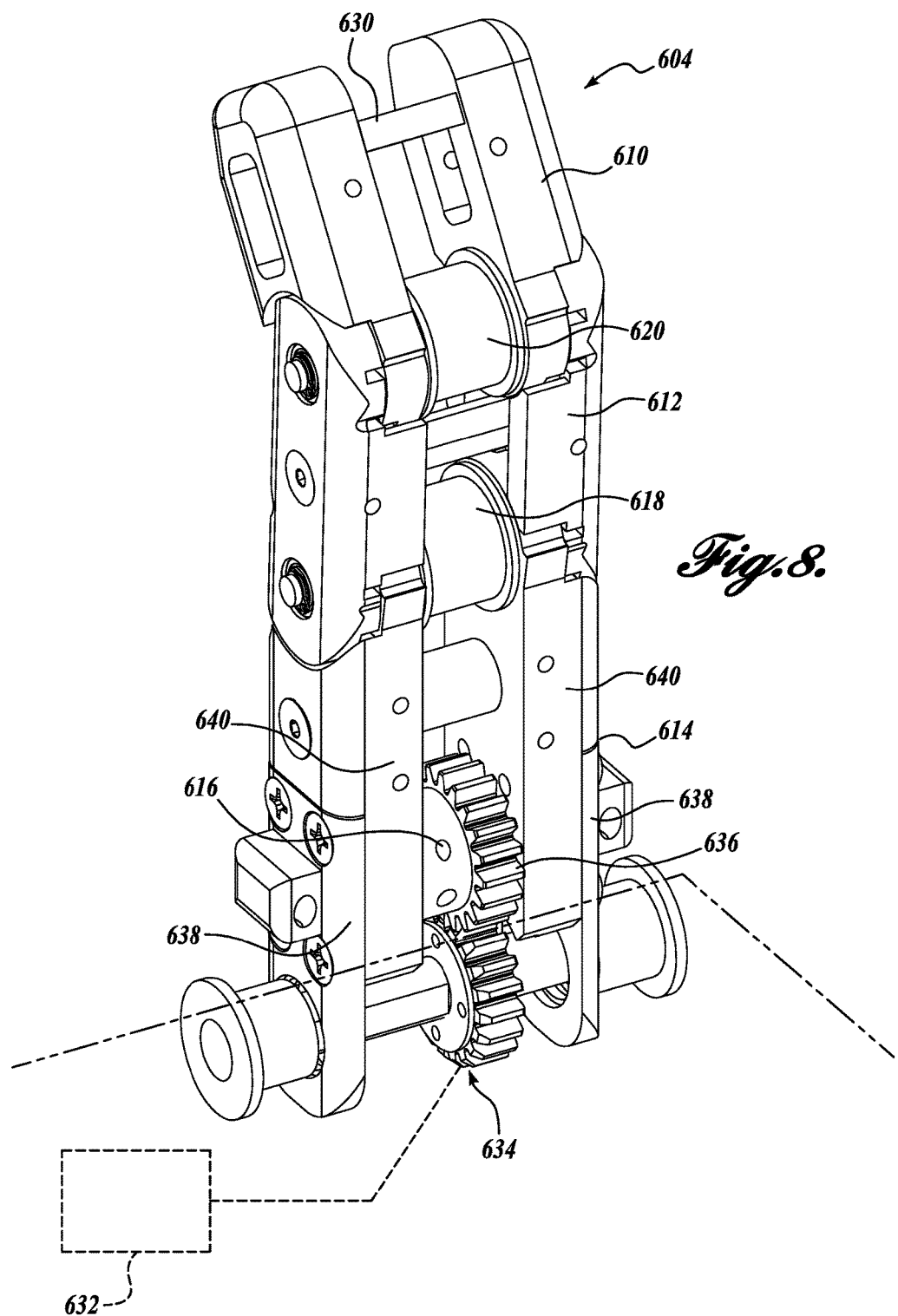

ROBOTIC FINGER ASSEMBLIES

CROSS-REFERENCES TO RELATED APPLICATIONS

This application is a division of application Ser. No. 14/599,321, filed Jan. 16, 2015 (now U.S. Pat. No. 9,469,036), which is a continuation of application Ser. No. 13/427,770, filed Mar. 22, 2012 (now U.S. Pat. No. 8,936,289), which claims the benefit of Provisional Application No. 61/466,391, filed Mar. 22, 2011, and is a continuation-in-part of application Ser. No. 13/048,724, filed Mar. 15, 2011 (now abandoned), which claims the benefit of Provisional Application No. 61/314,036, filed Mar. 15, 2010, all of which are hereby expressly incorporated by reference herein.

BACKGROUND

The field of robotics has seen great advances. Many robotic devices include hand like grippers or jaws to simulate the activities performed by a human hand, such as gripping and picking up objects.

Many robotic hand like devices include a plurality of opposed fingers. The fingers are driven mechanically using only unyielding, rigid components. Thus, if the fingers are unable to make contact with an object, the holding ability is compromised, and the robotic device fails to perform the job it was intended to do.

Accordingly, new robotic devices are continuously being sought to more closely replicate anthropomorphic characteristics of the human hand. For example, U.S. Patent Publication No. 2011/0144770 (hereby expressly incorporated by reference herein) shows a "One Motor Finger Mechanism" having a plurality of phalanges coupled to a single actuator using kinematic linkage and a differential linkage that allow the phalanges to curl to conform to an object when gripping.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

"Compliance" is a term used to mean the ability of a robotic jaw gripper to conform to the shape of an object, and also implies applying variable resilient pressure on the object.

In one embodiment, a robotic compliant jaw gripper, is described. The robotic jaw gripper includes one or more fingers, wherein each finger comprises a plurality of phalanges configured to grasp an object, wherein a phalange contacts a compliant element as the finger applies pressure against the object; and a preload unit configured to change the durometer of the compliant element.

In one embodiment, the phalange is the proximal phalange.

In one embodiment, the robotic compliant jaw gripper further comprises three fingers, wherein a first and second finger oppose a third finger.

In one embodiment, the robotic compliant jaw gripper further comprises a driver to drive the preload unit to change the effective durometer of the compressible material.

In one embodiment, the compliant element of the robotic compliant jaw gripper is compressible.

In one embodiment, the fingers of the robotic compliant jaw gripper are cable (tendon) driven and the compliant element is a tube.

In one embodiment, one of the phalanges of the robotic compliant jaw gripper is gear driven and the compliant element is a pad that abuts against a proximal phalange.

In one embodiment, a finger for a robotic jaw gripper is provided with a plurality of phalanges, and a tendon is configured to be pulled to close the finger around an object. A compliant element of compressible material is in series with the tendon, and a preload unit is configured to change the durometer of the compressible material.

In one embodiment, the compliant element comprises a first plate and second plate separated by a compressible material, wherein one or more adjustment screws are configured to compress or relax the compressible material by relative movement of the plates.

The robotic compliant jaw gripper of any one of the embodiments herein described may include a differential force distribution property that is enabled by the compliant element or elements, wherein the compliant elements enable conformal adaptation to both regular and irregular shapes during grip actuation.

The robotic compliant jaw gripper as herein described may further comprise a differential adaptation to a range of size/shapes enabled by compliant members.

The robotic compliant jaw gripper as herein described can be configured to provide bypassing or interfering/converging fingertip adaptors.

The robotic compliant jaw gripper as herein described may further comprise sensors for sensing grip strength or strain during gripping for purposes of providing haptic feedback, including through measurement of proportional displacement of compressible material (via optical, resistive, or linear displacement measurements of relative movement of sliding structure element of tendon based finger) at a given pre-load setting or via inferred torque generation derived from motor current measurements at a given preload setting.

In other aspects of the invention, the tendon tension of a multiple phalange finger can be adjusted in addition to independent adjustment of a series compliant resilient element.

In another aspect of the invention, a multiple phalange finger can be quickly and easily detached and replaced without complicated rerouting of a tendon or differential drive mechanism.

In another aspect of the invention, the phalanges can be resiliently biased to predetermined rest positions such as by torsion springs at the rotational axes of adjacent phalanges. Replacement torsion springs can be used to change the predetermined rest positions and/or the force required to move adjacent phalanges relative to each other.

In other aspects of the invention, a multiple phalange finger can be adjusted laterally relative to one or more opposing fingers, such as between a position in which the opposing fingertips are aligned for a pinching application or not aligned for an application in which the fingertips bypass each other to grip an object.

In another aspect of the invention, a multifingered robotic hand can be coupled to a robotic gripper, and control signals can be sent wirelessly to the hand unit, thereby increasing the utility of a gripper.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a diagrammatic perspective view of the inner side of a multiple phalange robotic finger in accordance with one aspect of the present invention, having differential cable or tendon driven movement with resilient compliance in accordance with the present invention.

FIG. 8 is a diagrammatic perspective view of one of the three fingers of the gripper of FIG. 7.

DETAILED DESCRIPTION

Figure 1:
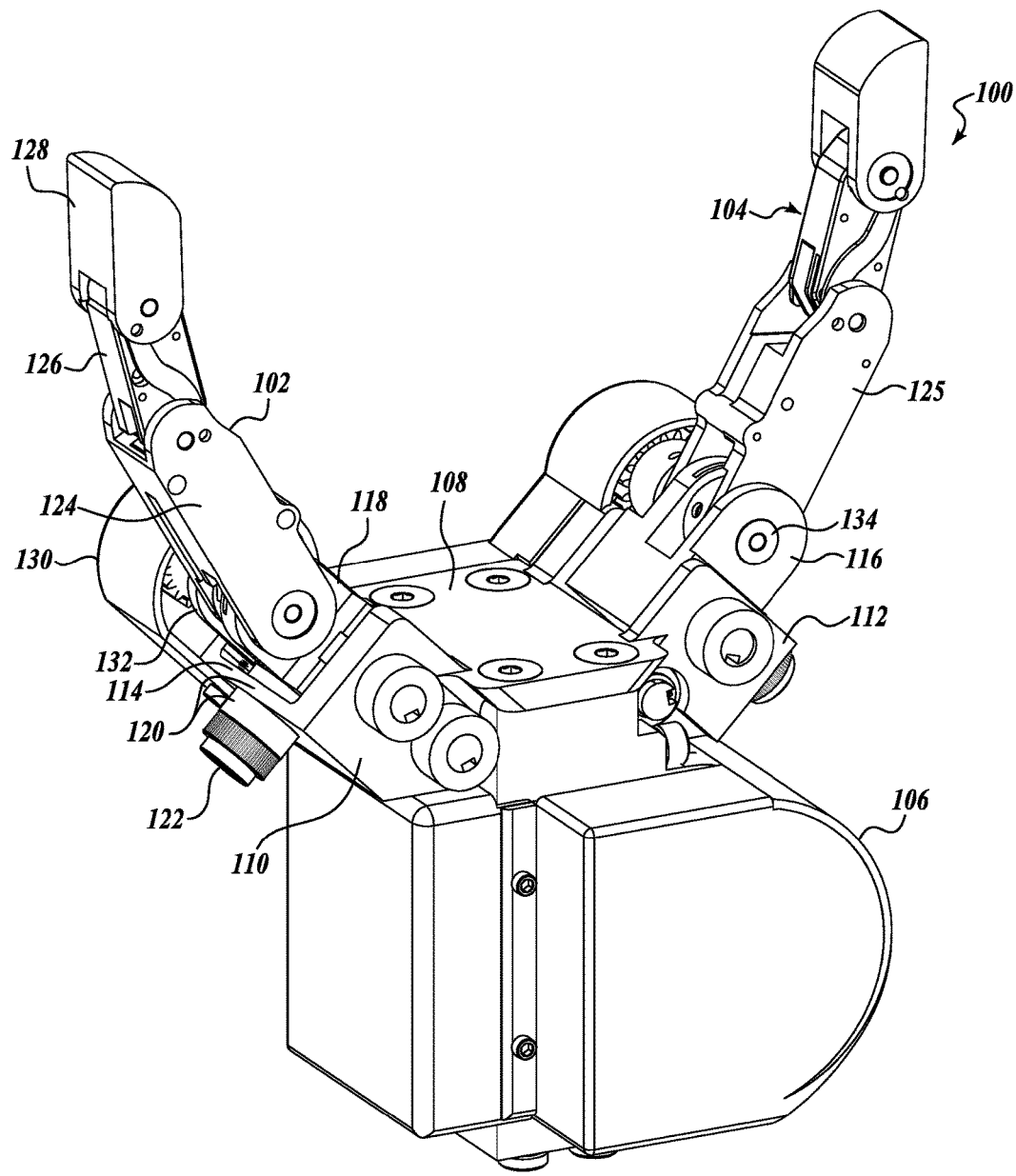
FIG. 1 is a diagrammatic perspective view of a two-finger robotic compliant jaw gripper in accordance with a first embodiment of the present invention.

In one embodiment, a robotic compliant jaw gripper includes two opposing fingers that provide for picking up and manipulation of objects at the fingertips and for conformally grasping large and irregular objects between the two fingers. One advantage of the robotic jaw gripper disclosed herein is in the ability to adapt to small or large object applications.

Additionally, the kinematics of the finger assemblies provide for human anthropomorphic conformance to easily and intuitively interact with objects via teleoperator control with minimal cognitive burden to the operator. These finger assemblies can be universally driven by a single motor drive and can be adapted to match other drive components in the robotic platform.

In one embodiment, the robotic compliant jaw gripper includes a variable compliance element in the finger mounting mechanism. First, the fingers are compliant when force is applied to the outside surface of the fingertip or distal phalangeal segment. In other words, the finger moves inward.

In another embodiment, the robotic compliant jaw gripper includes the use of a variable preset or preload pressure on a section of a selective durometer compressible material that is compressed between the finger base and an adjustable back pressure plate. The amount of preload pressure on the compressible material may be static, passively variable, or dynamically variable. In one embodiment, adjustment of the preload pressure on the compressible material can be made via thumb screws or small set screws affixed to the palm or hand structure. The preload setting can be varied, which then manifests as a change in the compliant properties of the finger.

As used herein, "compliance" or a derivative thereof is used to mean the ability of fingers to give or retract a variable amount when pressure is applied on the inside of the finger. In embodiments disclosed herein, the finger mechanism stalls or retracts a given amount against a compressible material. The finger mechanisms can allow the user to establish an operating point for compliant behavior that is appropriate for the application. A single additional actuator or an existing actuator within the system may be used to automatically preload the compressible material and dynamically varied from a remote distance while the operator is evaluating and engaging in specific mission applications. For example, in one embodiment, the preload pressure of the compressible material can be increased or decreased by coupling a lead screw that presses against the compressible material, and the lead screw is further connected to an actuator that can turn the lead screw in one direction to provide more preload pressure and in another direction to reduce the preload pressure. This allows the behavior to be modified from a very stiff and rigid operating point to set points more akin to relaxed positions in human function.

In another embodiment, a variable compliant behavior can be implemented in conventional robotic systems using an elastic element in series with the motor drive and through active impedance control loops running on the actuator mechanisms. While this approach achieves a portion of the desired characteristics, it has disadvantages. The power demands are significant and require significant processing power and communications bandwidth to maintain local control, and the control algorithms must be tailored to the specific capabilities of the selected motor drive.

In one embodiment, the finger mechanisms achieve compliant behavior without power, without processor control, and can be used with any motor drive without modification.

In another embodiment, the robotic compliant jaw gripper includes three opposing fingers, two fingers on one side and one finger on the opposite side, wherein the one finger passes between the center of the two separated fingers. In this embodiment, the bypassing finger assembly can be modified using quick attachment fingertip adaptors to allow a triangular pickup point for engaging very small objects such as wires or forensic materials.

In another embodiment, a dynamically variable compliant tendon and gear actuation assembly is provided. In tendon-based systems, compliance may be achieved by inserting a series elastic element such as a selectable durometer compressible tube in line with the tendon (cable).

In another embodiment, where a tendon is driven by a spool mechanism or where a gear-based system is coupled using a compliant shaft, the shaft element can be compressed using a wider variant of the two compression techniques described above or by using opposing compression plates to preload the elastic material. In the case of the tendon spool or pulley, the spool properties exhibit a change in compliant behavior as the spool is preloaded, and similarly, the properties of the compliant shaft may be changed by varying the preload condition. As disclosed herein, the preload operating setpoint may be adjusted manually via a threaded tube mechanism or compressing plates described herein or can be dynamically varied by using an active component of the system to cause the change.

In these embodiments, the variable compliance provisions of the gripper design becomes an enabling design characteristic for key differential behavior of the individual gripper digits. In order to grasp a range of objects from very small to quite large and to adapt the grasp of the end-effector to irregularly shaped objects. The 3-jaw compliant gripper and additional multi-digit embodiments must be capable of differentially actuating the individual digits in order to naturally conform around varied objects. This is accomplished by the combination of conformal linkages or tendon routing within the finger assemblies and through use of these compliant elements to distribute the resultant forces proportionally across the multiple digits of the gripper.

In another embodiment, a topographical control of high dexterity end effectors using intelligent state-machine based grasp mapping to joystick-based operator control can be used.

An algorithm for intuitively mapping control signals from existing robotic telemetry or operator control units for control of a multi-degree-of-freedom gripper or end effector assembly can be used, such as a joystick-based input with X-Y analog inputs. This state-machine based logic becomes a reliable way of mapping limited control input features into remote high degree of freedom robotic manipulator applications. In teleoperation-based missions, communications channels may be regularly interrupted and latency may be very high. Use of state-based operating algorithms preclude erratic behavior of the end effector in these situations by forcing the behavior to follow a predetermined sequential signaling scheme and by ensuring an orderly progression from one state to the next.

Additionally, the mapping of joystick inputs for end-effector control, such as coordinated grasp postures in multi-grasp end-effectors, takes advantage of significant study of human grasp function and transition so that the remote system behaves more like the humans' own experience reducing the cognitive burden on the operator while preserving the utility of existing user input control stations.

Force signals and contact information from interaction with remote objects are coupled back to a force feed joystick through specific grasp orientation mapping to maximize the effectiveness of operator feedback during teleoperation.

Referring to FIG. 1, a first embodiment of a robotic compliant jaw gripper 100 is illustrated. The robotic compliant jaw gripper 100 may be coupled to any mobile or stationary robotic device for use in picking up and/or holding objects. In one embodiment, the robotic compliant jaw gripper 100 may be attached to the end of a mobile extendable arm, for example.

In the embodiment illustrated in FIG. 1, the robotic compliant jaw gripper 100 includes a first and a second finger 102 and 104, respectively. While the embodiment illustrated in FIG. 1 includes a first and a second finger placed in an opposing configuration, it is to be readily appreciated that other embodiments of robotic compliant jaw grippers may be constructed including any number of fingers on opposing sides. For example, in an embodiment described below, a robotic compliant jaw gripper may include three fingers, two fingers on one side and a third finger on an opposite side positioned centrally between the other two fingers.

The robotic compliant jaw gripper 100 includes a casing 106. Casing 106 may house any motors or actuators, and the like, for operation of the first and second fingers 102 and 104. Additionally, casing 106 may serve as a support platform for the fingers 102 and 104.

A palm structure 108 is attached to the casing 106. The palm structure 108 includes a bifurcated hinge 110 projecting from a first side and a mirror image hinge 112 projecting from the opposite side of the palm structure 108. Each of the hinges 110 and 112 has spaced side plates that may extend at an angle, such as 45°, outward from the palm structure. However, the angle is variable, and any angle may be chosen, including vertical or horizontal. The side plates of hinge 110 are connected by a bridge or web 114 spanning from the lower inclined bottom edge of one side plate of the hinge 110 to the other side plate of the hinge 110. Hinge 112 has the same structure on the opposite side of the palm structure.

Each finger 102 and 104 can be provided with a plurality of "phalanges" that are hinged in series, of the construction shown and described in Patent Publication No. US 2011/0144770 (hereby expressly incorporated by reference herein). Such publication pertains to a "One Motor Finger Mechanism" having a plurality of phalanges coupled to a single actuator using kinematic linkage and a differential linkage that allow the phalanges to (a) move along a predetermined path in free space or when contacting an object at the fingertip; and (b) curl to conform to an object for gripping when the contact is at other locations of the finger. As best seen with respect to finger 104 (the finger at the right) in FIG. 1, a proximal phalange 116 is mounted between the first and second side plates of the hinge 112. The proximal phalange 116 is anchored to the hinge 112 via a pivot pin, for example. The lower end portion of the proximal phalange 116 is solid, whereas the top end portion of the proximal phalange 116 is a hinge bifurcated into a first and second member (first and second knuckles). As best seen with respect to finger 102 (at the left), the corresponding proximal phalange 118 of finger 102 rests against an inner compressible pad 120 which is engaged between the inner side of the web 114 and the outer side of the base portion of proximal phalange 118. The compressible pad 120 contributes to the selectable and variable compliant behavior described herein.

Figure 1A:
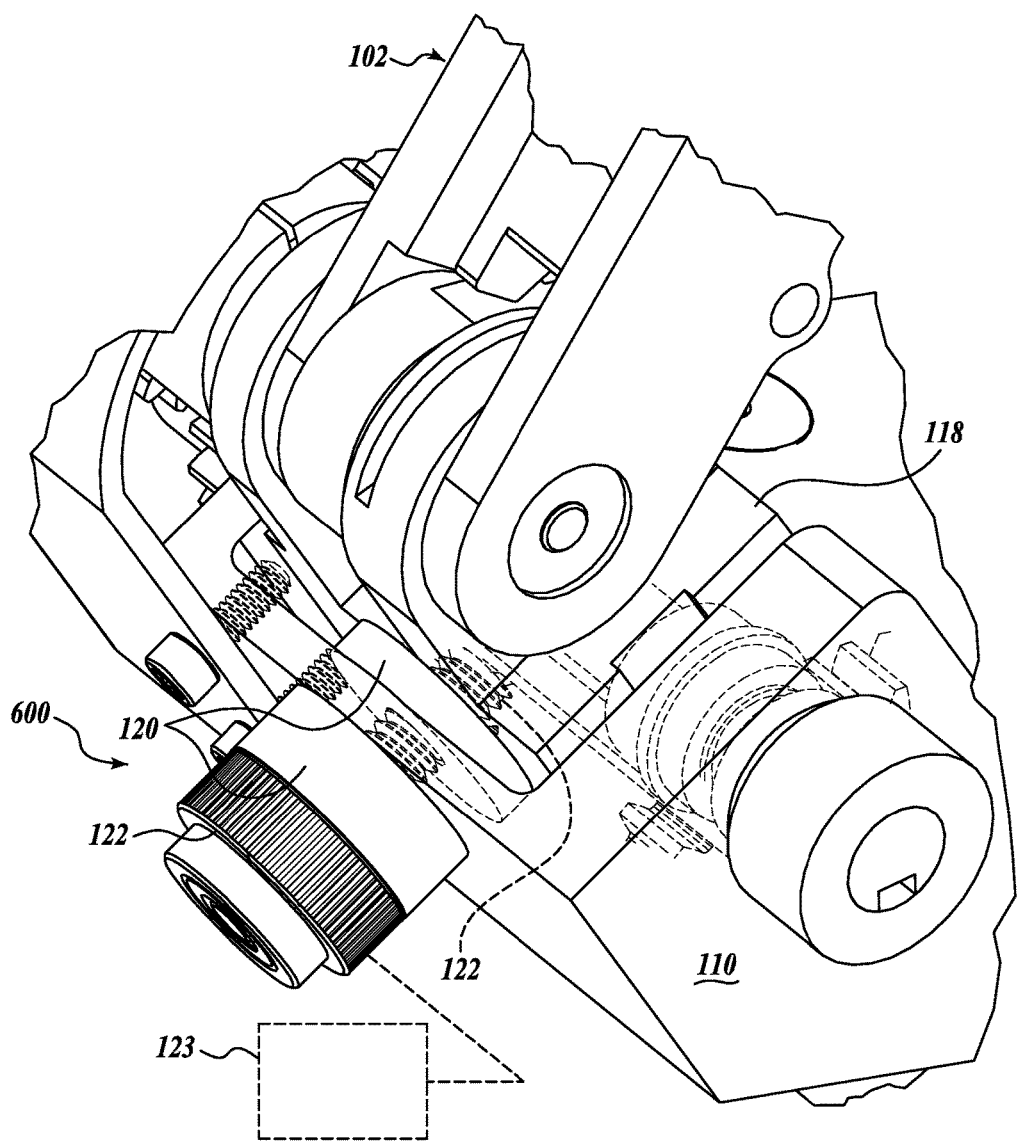
FIG. 1A is an enlarged, fragmentary, somewhat diagrammatic perspective view of a part thereof.

As seen in the detail of FIG. 1A, in the illustrated embodiment the compressible pad 120 has two parts, one on the inside of the web 114 and the other on the outside of the web. The pad can be elastomeric material, such as, but not limited to, rubber, foams, and the like. A set screw 122 has an enlarged head abutting against the outer compressible pad 120 and a shank that extends through the pad, an aligned hole or slot in the web 114, and through the inner pad 120. The inner end of the set screw is received in a threaded blind bore in the base of the proximal phalange 118. The set screw 122 can be turned clockwise, for example, to compress the compressible material 120 and provide a greater preload pressure. As used herein, a preload element is any device, automated or manually driven, that adjusts the durometer, i.e., the compressibility of the compliant materials described herein. A compliant material is referred to herein as a compressible element. Alternatively, the set screw 122 may be rotated counterclockwise, for example, to relieve the preload pressure. Rotation of the set screw can be manual, or by a remotely actuated motor represented diagrammatically at 123 in FIG. 1A. For example, the screw could be driven by a gear drive, chain and sprocket drive, and so on. While the preload pressure is experienced at the proximal phalange, it is to be appreciated that a compressible material can be provided in other phalanges to similarly apply a preload pressure other than the proximal phalange. When finger 102 engages an object, the contact will be resiliently cushioned to a desired degree as determined by the firmness (durometer) of the composite pad 120 which, in turn, is determined by the pad material used and the setting of the set screw.

Returning to FIG. 1, in addition to the proximal phalanges 118 and 116, the fingers include respective second phalanges 124 (for the finger 102) and 125 (for the finger 104) distal to the proximal phalange. Referring to finger 102, the phalange 124 is bifurcated both at the proximal end and at the distal end thereof. The bifurcated base or proximate end of the phalange 124 interdigitates with the bifurcated distal end of the proximal phalange 118 and is connected thereto by a pivot pin. The distal end of the second phalange 124 is further pivotally connected to the proximate end of a third phalange 126. The distal end of the third phalange 126 is pivotally connected to the proximate end of a distal phalange 128 which forms a fingertip. The distal-most surface of phalange 128, i.e., the fingertip surface for facing in the direction of the opposing finger 104, may be curved.

The drive mechanism for each finger can include a mechanical linkage connecting one phalange to another (see the patent publication referred to above). As shown in FIG. 1, a primary drive gear 132 can be encased in a housing 130. Drive gear 132 may be connected to a drive axle 134 as best seen in finger 104. The drive axle 134 is the "one motor drive" for the desired differential motion of the finger phalanges. A similar drive system is provided for finger 102.

Figure 2:
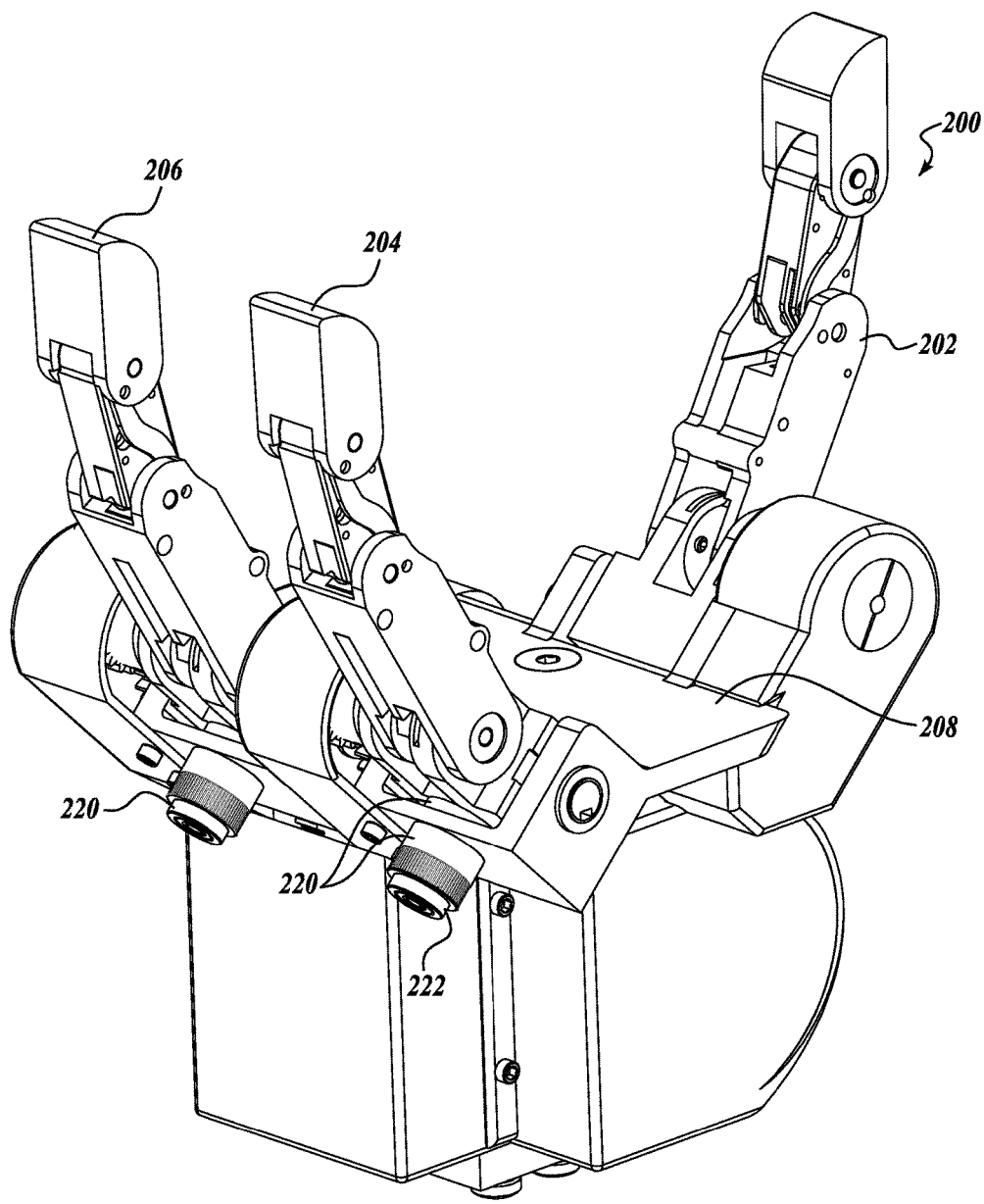
FIG. 2 is a diagrammatic perspective view of a three finger robotic compliant jaw gripper in accordance with a second embodiment.

Referring to FIG. 2, a second embodiment of a robotic compliant jaw gripper 200 is illustrated. The robotic compliant jaw gripper 200 illustrated in FIG. 2 includes three fingers 202, 204, and 206. Fingers 204 and 206 are placed on one side of the robotic compliant jaw gripper 200 (one side of the palm structure 208). The third finger 202 is placed on the opposite side of the palm structure, opposing fingers 204 and 206 such that when the three fingers close on an object, the finger 202 may pass through the space separating fingers 204 and 206.

Each of the fingers 202, 204, 206 is of the same construction as the finger 102 or 104 described above relating to the embodiment shown and described with respect to FIGS. 1 and 1A. More specifically, fingers 202, 204, and 206 each include a compressible pad 220 and set screw 222 system at the base of the lowermost proximal phalange of each finger. These elements provide for the adjustable compliance of each finger the same as the corresponding parts for the earlier described embodiment.

Figure 3:
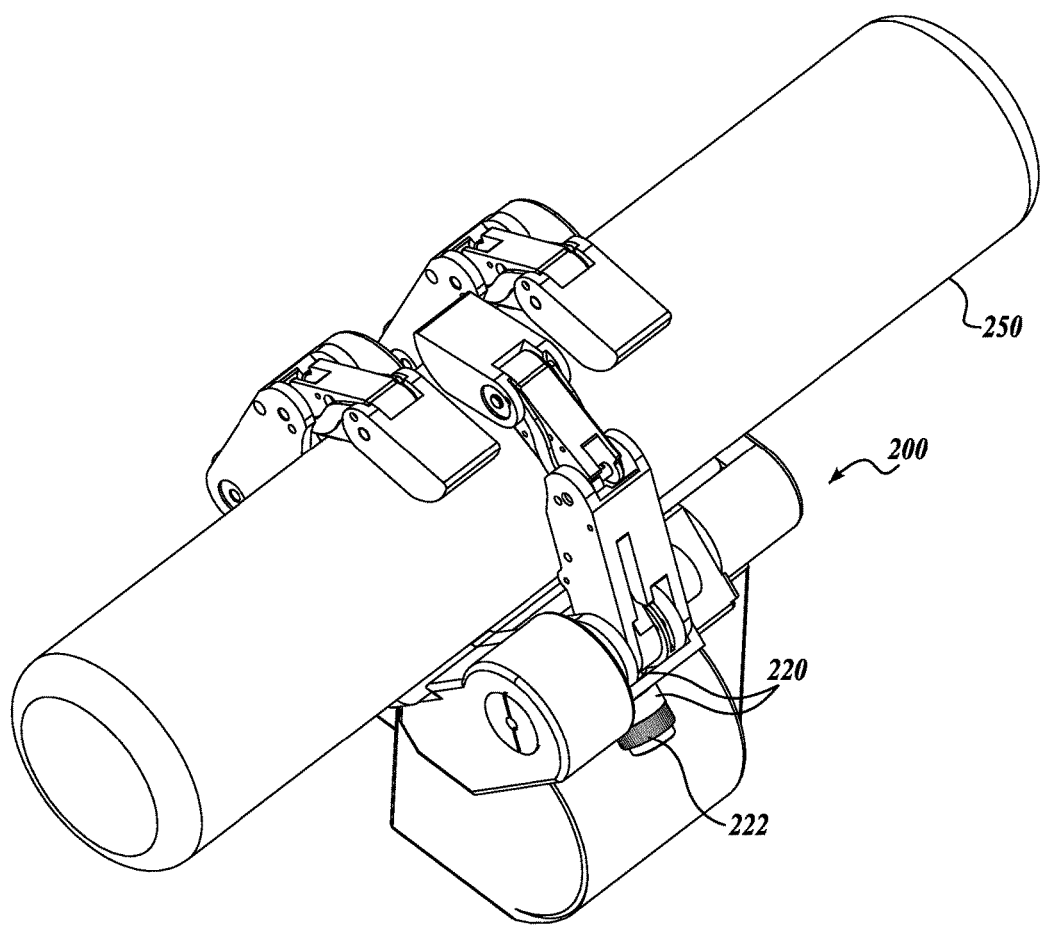
FIG. 3 is a diagrammatic perspective view of the robotic compliant jaw gripper of FIG. 2 with parts in different positions for gripping an object of uniform diameter.

Referring to FIG. 3, the three-finger robotic compliant jaw gripper 200 of FIG. 2 is shown grasping an object 250. In this position, the compressible compliant elements 220 and 222 have an effect as the robotic compliant jaw gripper 200 grips the object 250. Thus, when the fingers swing in and make contact, movement of the proximate phalanges is cushioned by the compressible compliant material, resulting in tunable compliance as the object is then gripped with more force.

Figure 4:
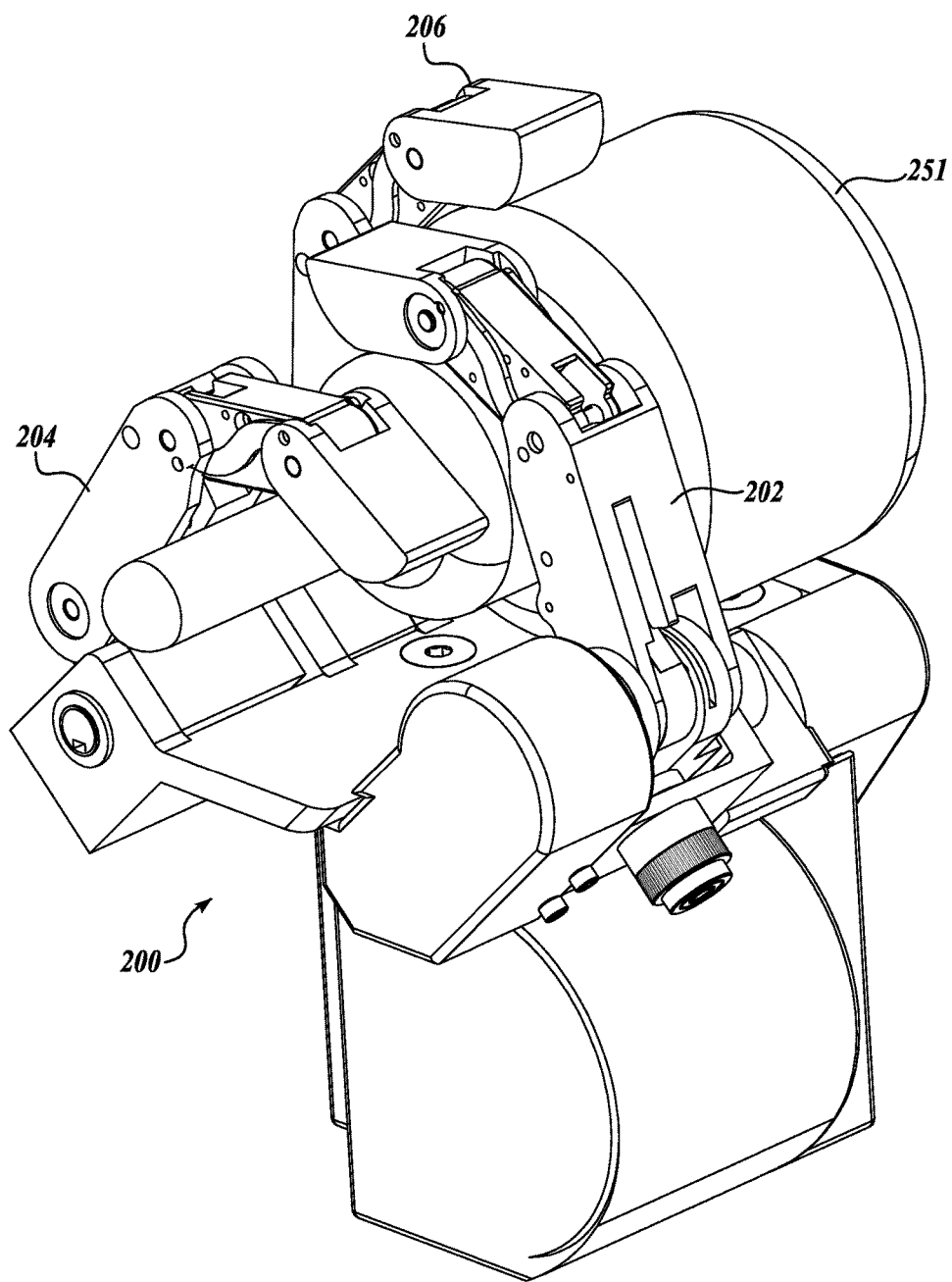
FIG. 4 is a diagrammatic perspective view of the robotic compliant jaw gripper of FIG. 2, with parts in different positions for gripping an object of varying diameter.

Referring to FIG. 4, a diagrammatic illustration is provided showing the robotic compliant jaw gripper 200 illustrated in FIG. 2 grasping an irregular object. As can be appreciated, each of the fingers 202, 204, and 206 can be driven to make contact with the object 251. A feature of the robotic compliant jaw grippers disclosed herein is the ability of individual fingers to conform independently to the object 251. In the illustrated embodiment, each of the fingers conforms to a different radius of the object 251, and the degree of compliance for each finger can be independently set or adjusted.

In the field of robotic fingers, there are other differential drive systems for multiple hinged phalanges to achieve movement along a predetermined path in free space or when contacting an object at the fingertip, and curling to conform to an object for gripping when the contact is at other locations of the finger. One such system is a cable or "tendon" drive system which is represented diagrammatically in FIG. 5 for a robotic finger 400. The finger 400 includes four phalanges. In order of proximal to distal, the phalanges are 402, 404, 406, and 408. Adjacent ends of adjacent phalanges are pivotally connected. A control cable 410, or tendon, spans the length of the four phalanges. The routing of the tendon from the tip phalange 408 to the proximate or base phalange 402 and back again is configured for the desired "push-pull" differential drive by a single motor represented at 412. At the fingertip, tension applied only to one end portion of the tendon has the effect of moving the finger in a gripping direction and tension applied only to the other end portion of the cable has the effect of moving the finger in the opposite (nongripping) direction. Stated in another way, movement at the fingertip is achieved by hauling in one end portion of the tendon and paying out the other end portion of the tendon. In one configuration the motor drives a proximate rotating drive shaft 414 directly in one direction or the other for moving the finger by controlling the movement of the tendon through the differential drive system. In another representative configuration, the motor could drive a bevel gear arrangement 416 via a drive shaft 418 and universal joint 420.

Figure 1B:
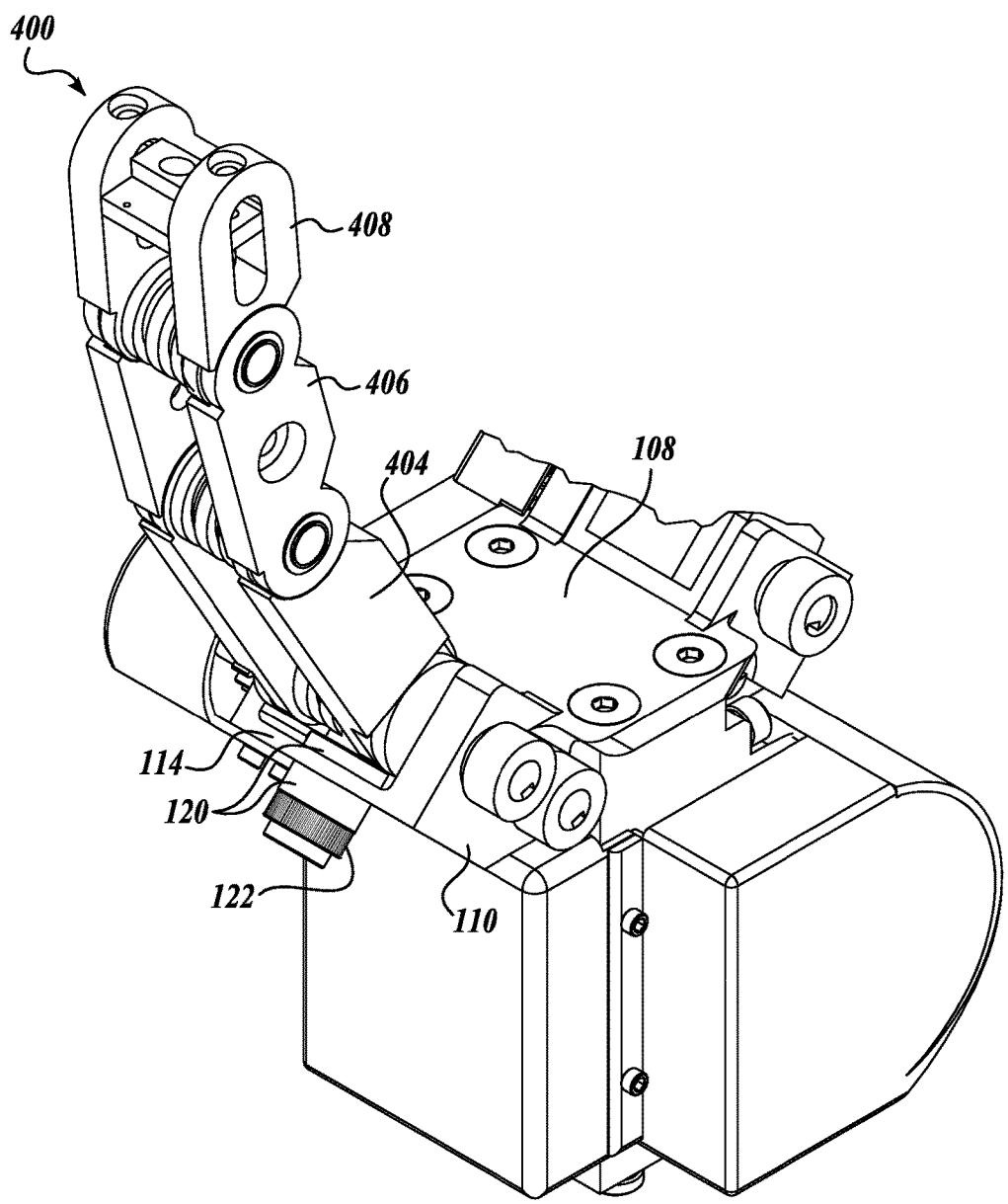
FIG. 1B is a perspective corresponding to FIG. 1 using two opposing fingers of a different design.

The base or proximal phalange 402 corresponds to the proximal phalanges described above for the embodiments and configurations of FIGS. 1, 1A, 2, 3, and 4. FIG. 1B, for example, shows one finger 400 of an opposing tendon driven pair mounted in the same configuration as the mechanical linkage driven fingers of FIGS. 1 and 1A. The compliant and preload elements 120 and 122 are shown diagrammatically and operate essentially the same as previously described. One part of the compliant pad structure is engaged between the inner side of the web 114 and an outer side portion of the proximal phalange 402, and another part of the compliant pad structure is engaged between the outer side of the web and the enlarged head of the set screw 122. Turning the set screw (manually or by motor control) adjusts the compression of the pad structure and its firmness or durometer. When finger 400 engages an object, the contact will be resiliently cushioned to a desired degree and the compliance as more pressure is exerted is determined by the preload pressure.

Figure 5A:
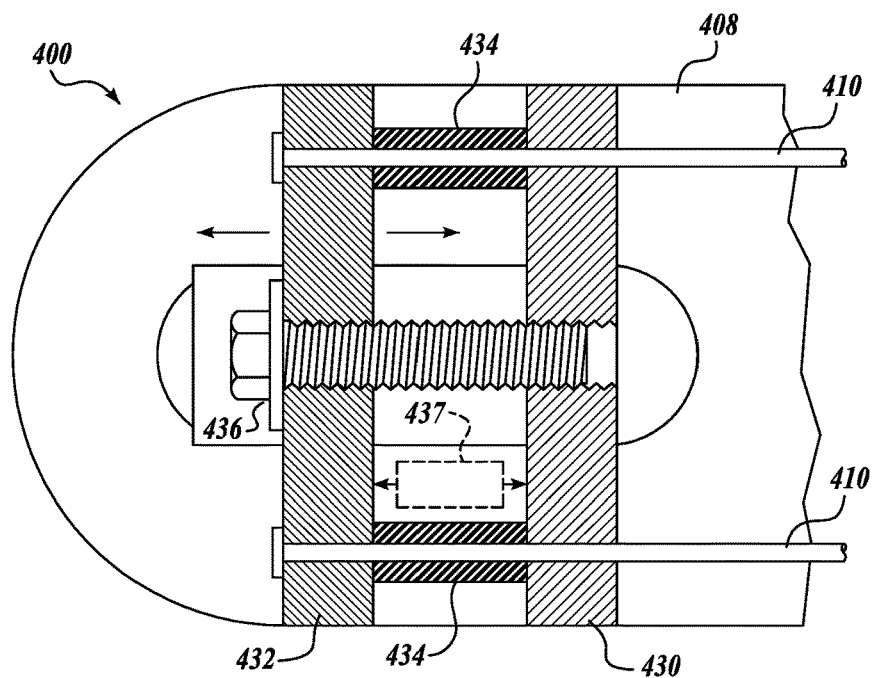
FIG. 5A is an enlarged, fragmentary, detail of the distal tip portion of the finger of FIG. 5 illustrating a first embodiment of compliant structure.

FIGS. 5 and 5A illustrate a compliance system provided at the tip portion of a finger having a differential tendon drive system. The distal end portions of the control cable or tendon 410 extend through holes in a fixed plate 430 that extends across the interior of the distal phalange 408. The tendon ends are anchored to a slidable plate 432 mounted above (distally relative to) the fixed plate. The two plates are separated by resilient compressible material 434 which can be a pad or block or, as shown in the drawings, tubes through which the tendon end portions pass. As shown in FIG. 5A, an adjustment screw 436 (turnable manually or by motor control) is provided to adjust the distance between the two plates which adjusts the preload force applied by the resilient compressible material and the compliance as the tendon is stressed.

Generally, the compressible tubes serve as series elastic elements and transfer native compliance to the tendon 410 and finger kinematics. However, the addition of the preload fixture enables the compliant tubes to be compressed to any degree, increasing their firmness and effectively decreasing the resiliency of the tendon 410. This effectively stiffens the hand and lowers its compliance.

In some applications, it is desirable that the force applied by the gripper fingers be known and/or monitored by feedback to assist in tuning the grasping force or speed or for other purposes. The degree of compression of the resilient compressible material provides an indication of the force applied, which can be inferred or calculated by measuring the displacement of the relatively movable pieces between which the resilient compliant material is compressed. The degree of compression or displacement can be measured through several means including capacitive sensing, optical sensing, or variable resistance methods. Box 437 in FIG. 5A represents a displacement sensor which can provide the desired indication of the amount of compression of the elements 434 from which the force calculation can be made.

Figure 5B:
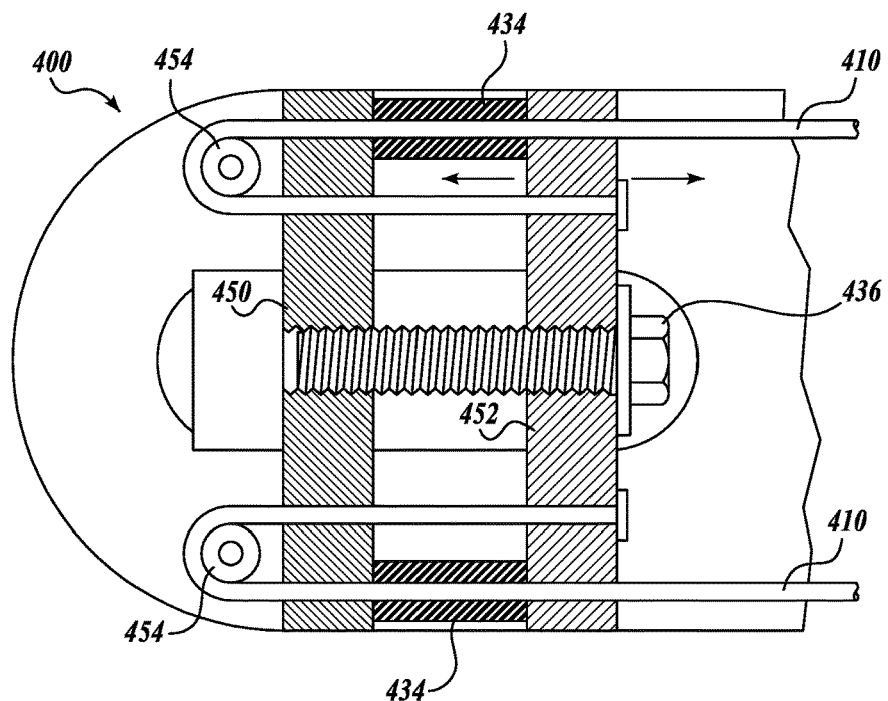
FIG. 5B is a corresponding enlarged, fragmentary, detail of the tip portion of a modified finger illustrating a second embodiment of compliant structure.

Referring to FIG. 5B, a second embodiment for a compliant unit for a tendon driven finger is illustrated. A sliding preload structure has a first, distal cross plate 450 that is fixed in phalange 408 and a second sliding plate 452 below (more proximate than) plate 450. The two plates are separated by resilient compressible material 434 which can be a pad or block or, as shown in the drawings, tubes through which the tendon end portions pass. Each end portion of the tendon 410 passes through the sliding plate 452, the compressible material 434, the fixed plate 450, and then is wrapped around a roller 454 mounted above the fixed plate 450. From there each tendon end portion passes back through the fixed plate and a compliant element, such as a tube 434, and is anchored to the sliding plate 452. An adjustment screw 436 (turnable manually or by motor control) is provided to adjust the distance between the two plates which adjusts the preload force applied by the resilient compressible material and the compliance as the tendon is stressed. Thus, the variable durometer of the compliant elements 434 can be used to set and adjust the compliant behavior of the finger 400.

As can be appreciated from the above description, compliant elements are provided that perform when the fingers grasp an object, and the resistance of the object is transmitted eventually from the finger to the compliant element, wherein the compliant elements may compress to provide a varying pressure applied by the finger. Furthermore, in the embodiments of the compliant element described, the compliant element is further connected to a preload unit, wherein the preload unit can vary the durometer of the compliant element or elements. Such preload units can be operated manually, or may be operated remotely and automatically through a user interface.

Figure 6:
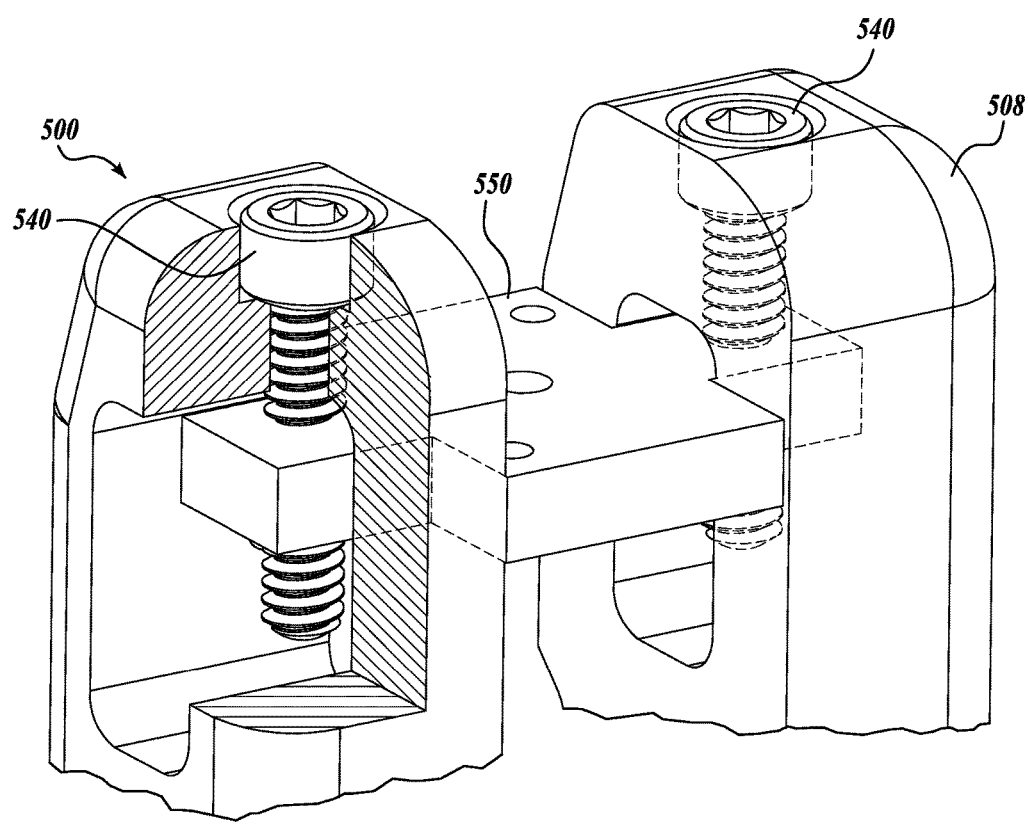
FIG. 6 is an enlarged, fragmentary, diagrammatic perspective view of a modified tip portion for a finger of the type illustrated in FIG. 5.

FIG. 6 is a diagrammatic representation of a modified tip structure for a differential tendon driven robotic finger. The distal phalange 508 of a finger 500 of the general type shown in FIG. 5 has a cross plate 550. Plate 550 corresponds to the fixed plate of the embodiment of FIG. 5A or 5B, but in the modified embodiment, the plate 550 has threaded holes at the sides receiving the threaded shanks of adjustment screws that extend proximally from distal end of the fingertip. Turning the screws adjusts the position of plate 550 along the phalange 508 which has the effect of adjusting the overall tendon tension without unduly changing the preload and compliance characteristics of an associated resilient compressible compliance unit. For example, in FIG. 5A, the effect of changing the position of the fixed plate 430 is to shift the entire compliance structure and change the tendon tension without necessarily directly affecting the position of the sliding plate 432 relative to plate 430. Similarly, in FIG. 5B, the effect of changing the position of plate 450 is to change the tendon tension without necessarily directly affecting the compliance and preload characteristics. Consequently, the tendon tension can be adjusted independently of the compliance and preload components by use of the modification represented in FIG. 6.

Figure 7:
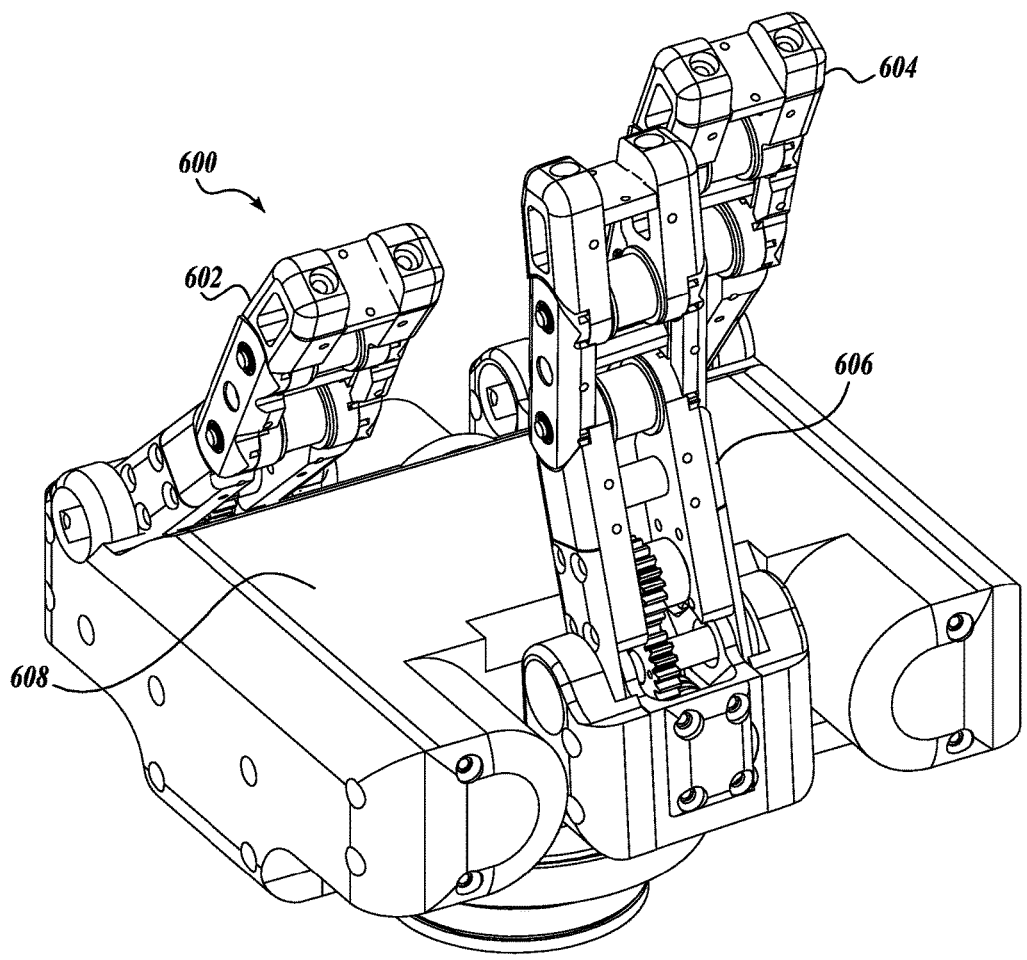
FIG. 7 is a diagrammatic top perspective view of another embodiment of a three-finger robotic gripper in accordance with the present invention.

The robotic hand assembly 600 shown in FIG. 7 shows two identical swingable fingers 602 and 604 mounted at one side of a housing 608. A third finger 606 is mounted at the opposite side of the housing in a position aligned with the space between the fingers 602 and 604. The motors, control electronics, and so on, are contained within the housing 608. The base of the housing can be coupled to a robotic arm, such as an arm extending from a mobile robot.

The construction of the fingers is best seen in FIG. 8 which shows finger 604, the construction of the other fingers for the parts described being the same. Finger 604 includes a distal phalange 610 pivotally mounted on an intermediate phalange 612. Phalange 612 is, in turn, pivotally mounted on a more proximate phalange 614. Preferably, the three phalanges are driven by a differential drive, such as a tendon-based or direct mechanical linkage-based, or some combination which allows one or two motors to cause the phalanges to move along a predetermined path in free space or when pinching an object at the fingertips, and to curl consecutively from the proximate phalange to the distal when the object is contacted at another location of the finger. Details of the drive between the phalanges are not illustrated or described in detail because they are conventional and known in the art. In general, the cooperating drive members are coupled between a pulley, spool, roller, or other cylindrical element 616 located toward the base of the proximate phalange 614, a spool (roller, pulley, and so on) 618 at the joint between the phalanges 614 and 612, a similar spool 620 (roller, pulley, and so on) at the joint between phalanges 612 and 610, and the tip portion of the phalange 610 such as at a cross plate 630. Compliance elements of the type previously described can be incorporated, such as near the base of the proximate phalange 614 and/or in the tip portion of the distal phalange 610.

However, rotary power from a motor represented at 632 is provided to a bottom drive shaft and gear assembly 634. The gear of assembly 634 meshes with a finger drive gear 636 which turns the drive member 616.

Figure 8A:
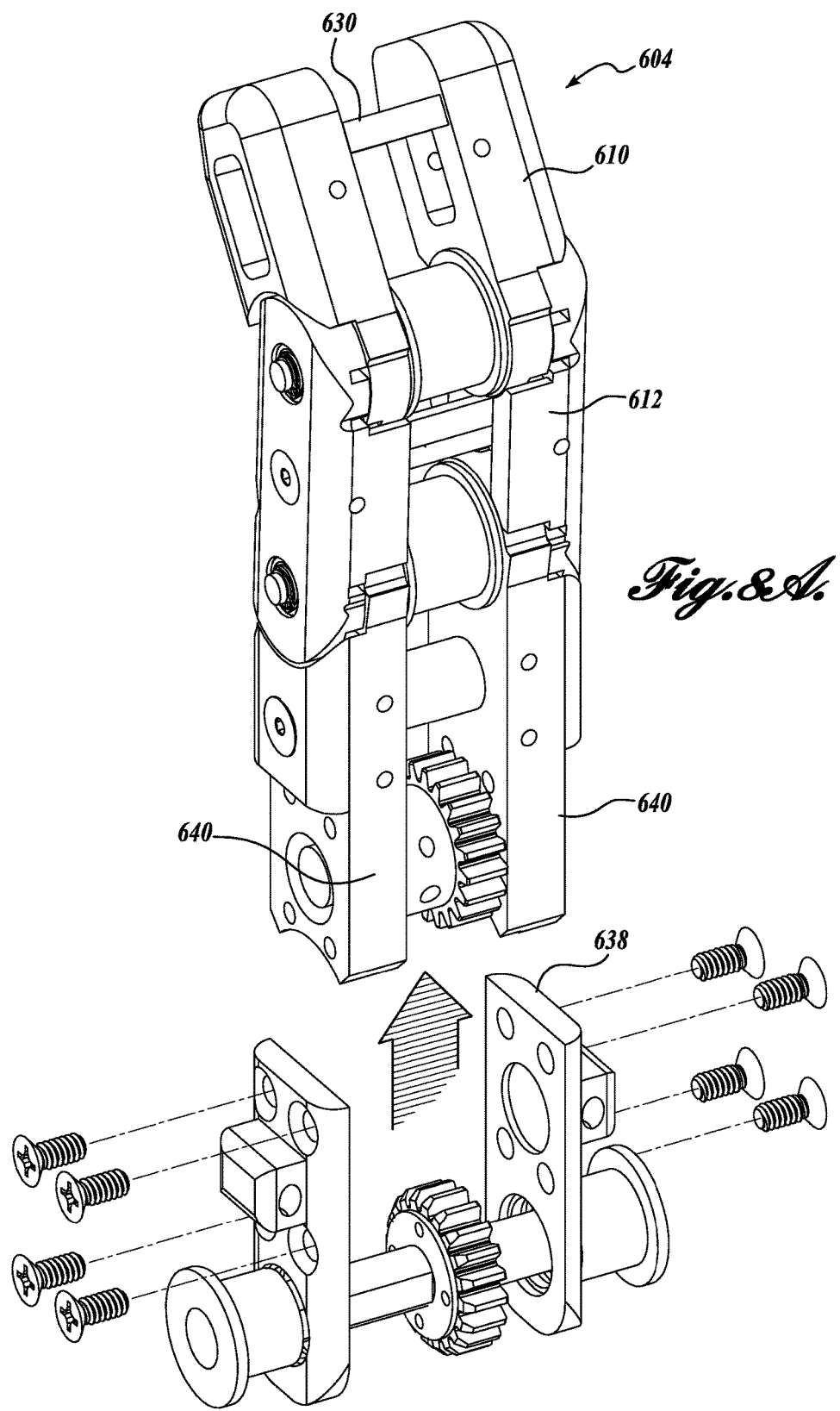
FIG. 8A is a corresponding diagrammatic top perspective view with some parts shown in exploded relationship.

In the embodiment shown, opposite upright mounting plates 638 extend alongside structural side rails 640 of the proximate phalange 614. The mounting plates are connected to the side rails by machine screws or other quick disconnect fasteners. As seen in FIG. 8A, removing the fasteners frees the finger assembly and all parts of the differential drive for removal from the mounting plates. This is extremely convenient for removal and replacement of a damaged or worn finger because, among other things, the differential drive components need not be replaced, reconnected, rerouted, readjusted, and so on. Further, modified fingers can be substituted for other fingers so long as the meshing gear design is compatible.

Figure 9:
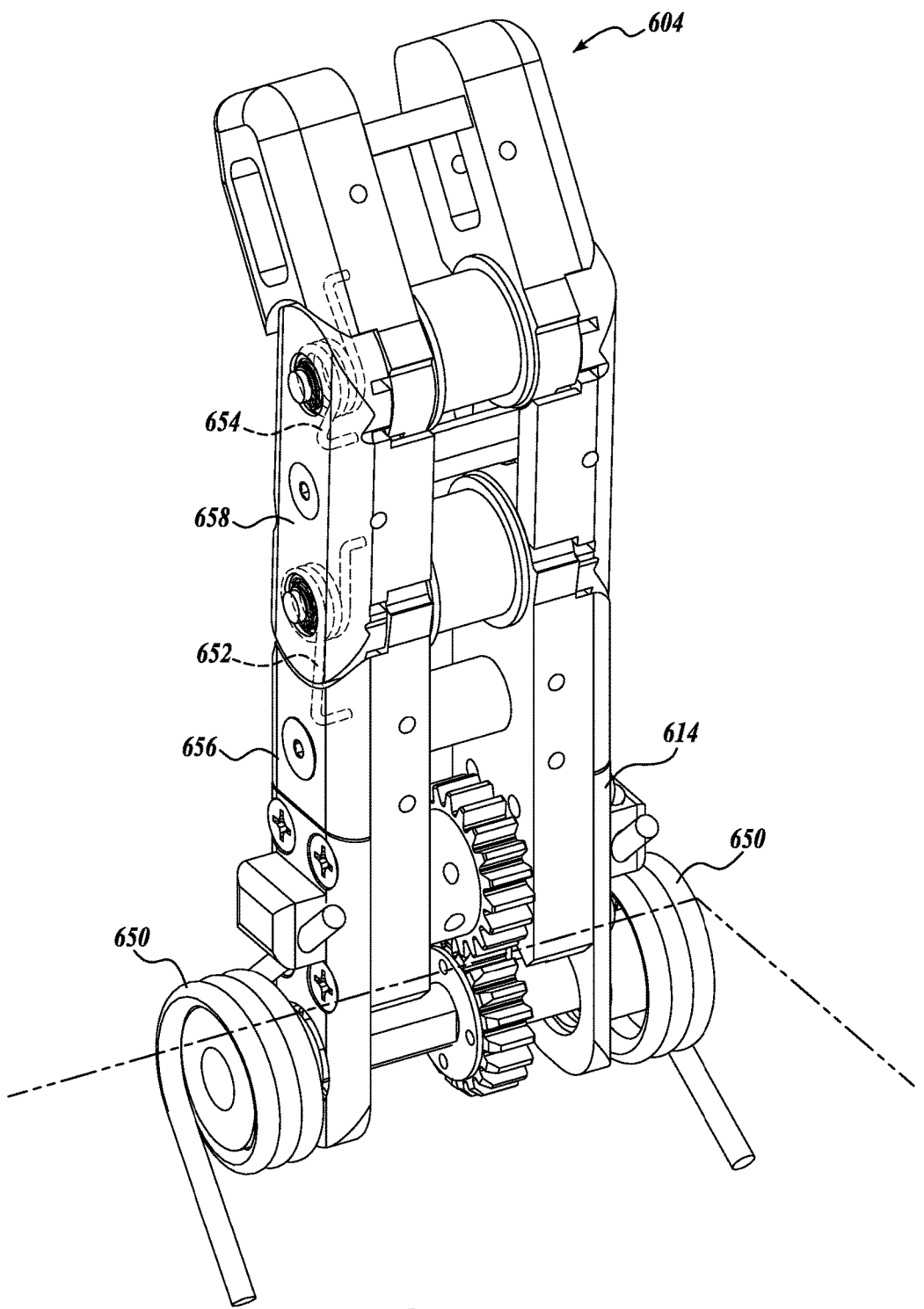
FIG. 9 is a diagrammatic top perspective view of a modified finger for a gripper of the general type shown in FIG. 7, having preload resilient elements at the junctions of the finger phalanges.
Figure 9A:
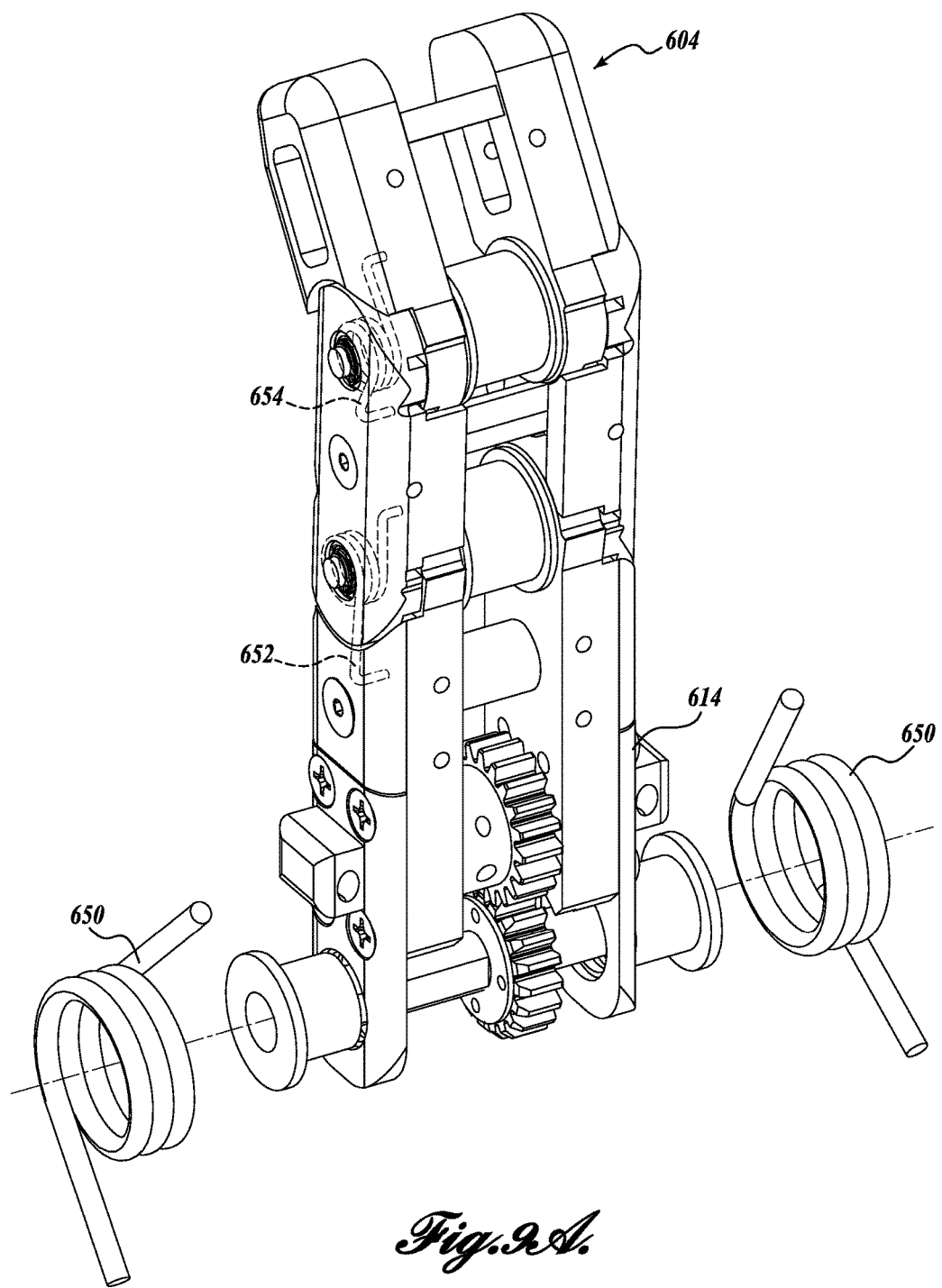
FIG. 9A is a corresponding top perspective view with some parts shown in exploded relationship.

In the orientation of FIG. 8, the proximate phalange extends vertically or nearly vertically, the intermediate phalange 612 is approximately aligned with the proximate phalange 614, and the distal phalange 610 is angled to a hyperextended position relative to the proximate and intermediate phalanges. This may be desirable in order to prevent initial contact with an object to be gripped by the tip of the distal phalange as compared to a lower part of the finger. With reference to FIG. 9, the initial or "rest" orientation of the phalanges can be achieved by use of spring elements, such as torsion springs at each of the joints. The bottom torsion springs 650 have arms engaged, respectively, with the proximate phalange and the housing or other lower mounting structure. In the embodiment shown, the neutral position is nearly vertical, but depending on the application, a different orientation may be desired. To achieve a different orientation, the bottom torsion springs 650 can be separated from the assembly as represented in FIG. 9A, and new springs having different spring characteristics joined to the assembly. In one preferred embodiment, the torsion springs may bias the bottom phalange and, consequently, the upper portions of the finger toward a gripping position, in which case a spring assist is provided in the gripping direction. Spring orientation and assist also can be provided at the more distal joints, such as by replaceable torsion springs 652 and 654 at the middle and distal joints, respectively. Access to the upper torsion springs can be by removable covers 656 and 658, for example. Choice of the spring positions, tensions, and direction of biasing allow the finger characteristics to be tailored for a desired application, which is another aspect that makes the interchangeable fingers convenient. Assistive spring mechanisms may be incorporated to affect the kinematics of the finger for pitching against a fixed surface or second finger assembly for assisting the powered actuation of the finger.

Figure 10:
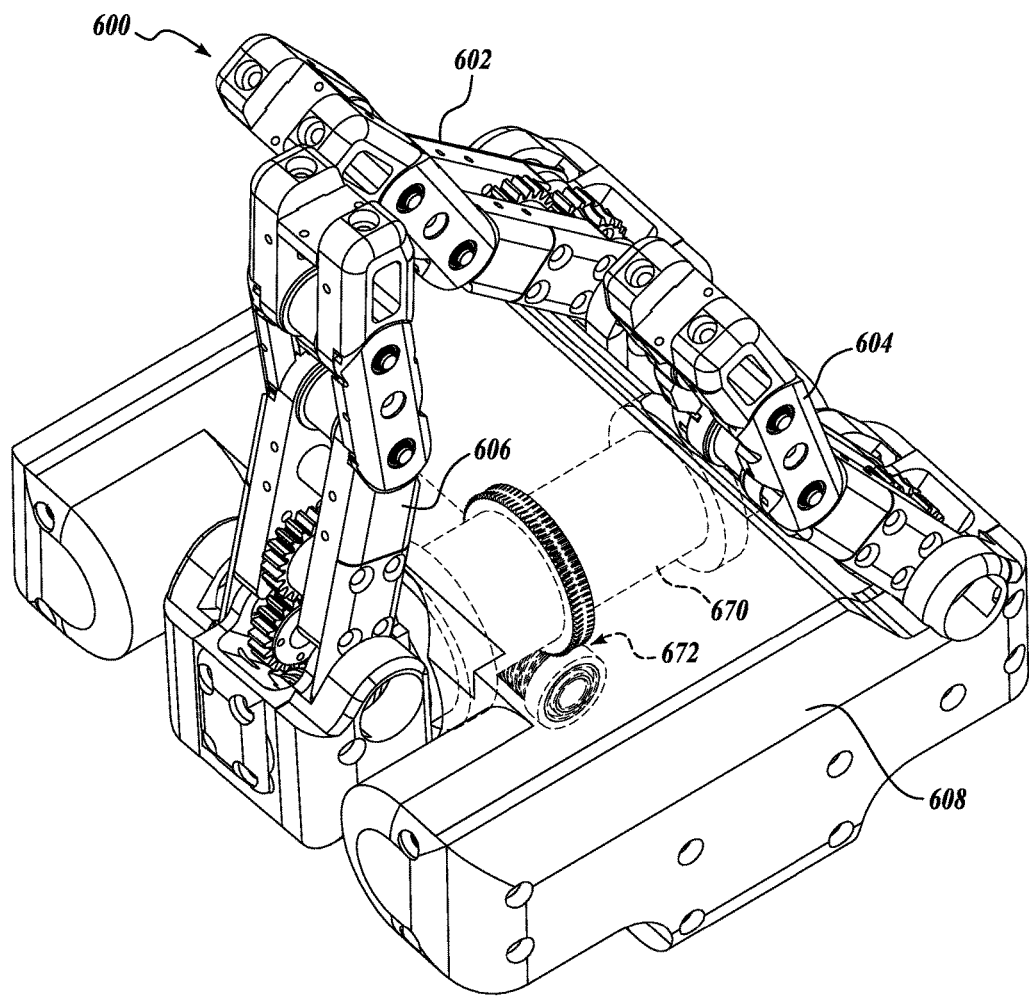
FIG. 10 is a diagrammatic top perspective view of a robotic gripper in accordance with the present invention having a plurality of fingers, at least one of which is swingable laterally.
Figure 10A:
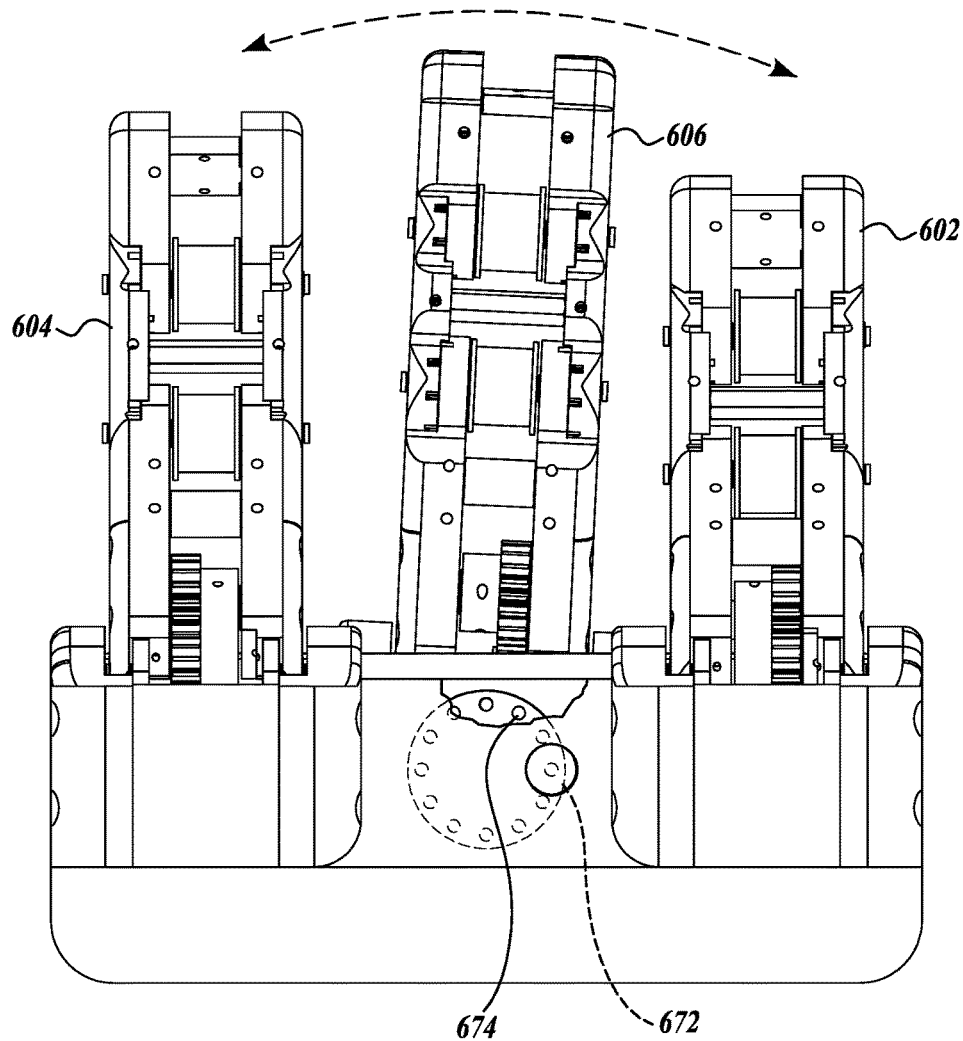
FIG. 10A is a side elevation of a gripper similar to the gripper of FIG. 10, having a modified form of laterally swingable finger.

Another aspect of the improved gripper 600 is best described with reference to FIG. 10. The spaced fingers 602 and 604 at the same side of the housing 608 are designed to swing in a predetermined arc toward and away from the top or palm section of the housing. The finger 606 at the opposite side has an additional range of motion, namely, lateral swinging about the axis of a bottom cross shaft 670 to which it is mounted. In the embodiment illustrated in FIG. 10, shaft 670 is rotatable by means of a powered worm gear drive 672. Thus, finger 606 can be swung from a position aligned with the space between fingers 602 and 604 to a "pinching" position in which the fingertip will directly engage one of the other fingers. Depending on the rotated position of the shaft 670, the pinching motion is akin to the position of the thumb of one hand when engaged against the tip of the index finger, as compared to when engaged against the tip of the middle finger, or a position slid between the index finger and the middle finger. In the construction of FIG. 10, the worm drive is driven by a motor, but it could also be manual to preposition the "thumb" 606 for a specific application. With reference to FIG. 10A, in another embodiment, the rotary mounting for the thumb may have preselected rotative positions, any one of which may be selected by engaging a spring-loaded pin member 675 in a selected hole 674 of a collar mounted on the drive shaft, accessible from the opposite side of the housing, i.e., the side having the fingers 602 and 604.

In another case, the finger mechanisms may be implemented in an anthropomorphic geometry as four individual fingers and an opposing thumb. The thumb assembly may have the same design properties as the fingers but be mounted on a hinged mechanism placed at an angle dissecting the wrist similar to that of the natural "lifeline" of a human hand. In this case, the thumb may oppose one or more of the finger mechanisms to mimic human hand function through a significantly simplified geometry enabled by the compliant characteristics of the fingers. Even in a three-jaw gripper, the swingable thumb feature allows a change in function from an optimized conformal grasping device to a pinch grip configuration. Pinch grip may be used to pick up small objects using opposing surfaces similar to those of the natural human fingertips.

Figure 11:
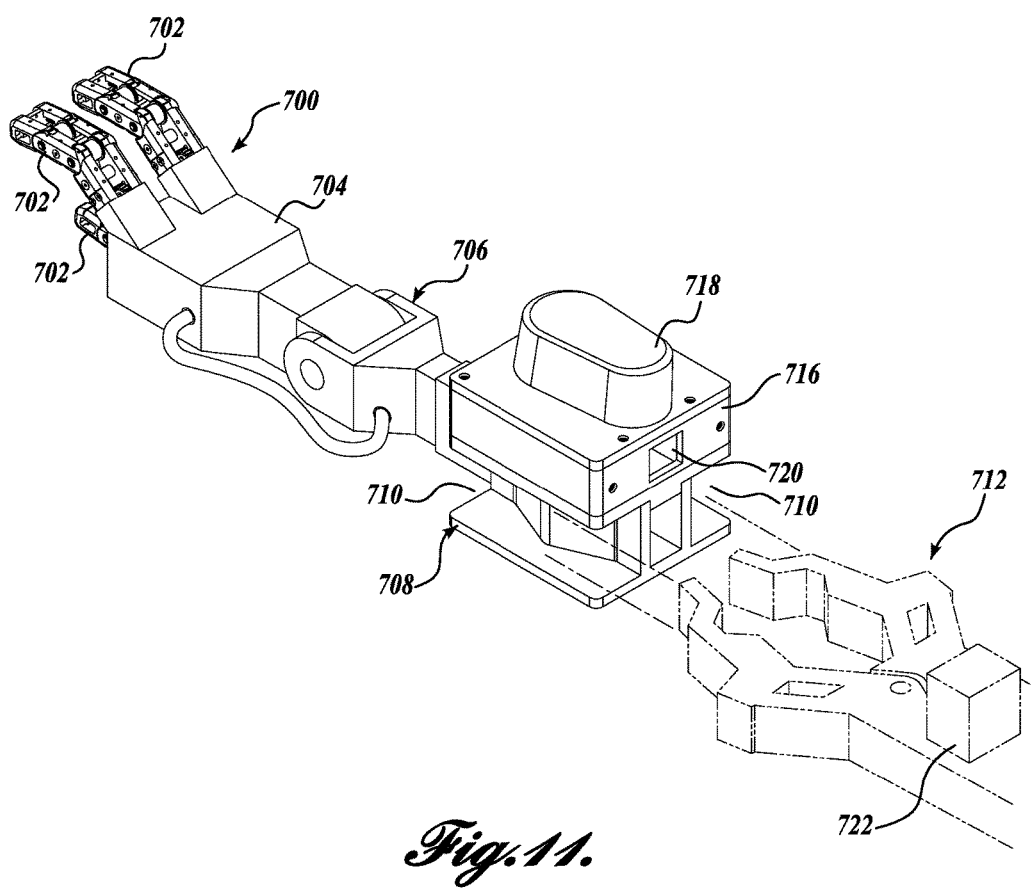
FIG. 11 is a diagrammatic top perspective of a robotic extension hand in accordance with the present invention having wireless control capabilities.
Figure 11A:
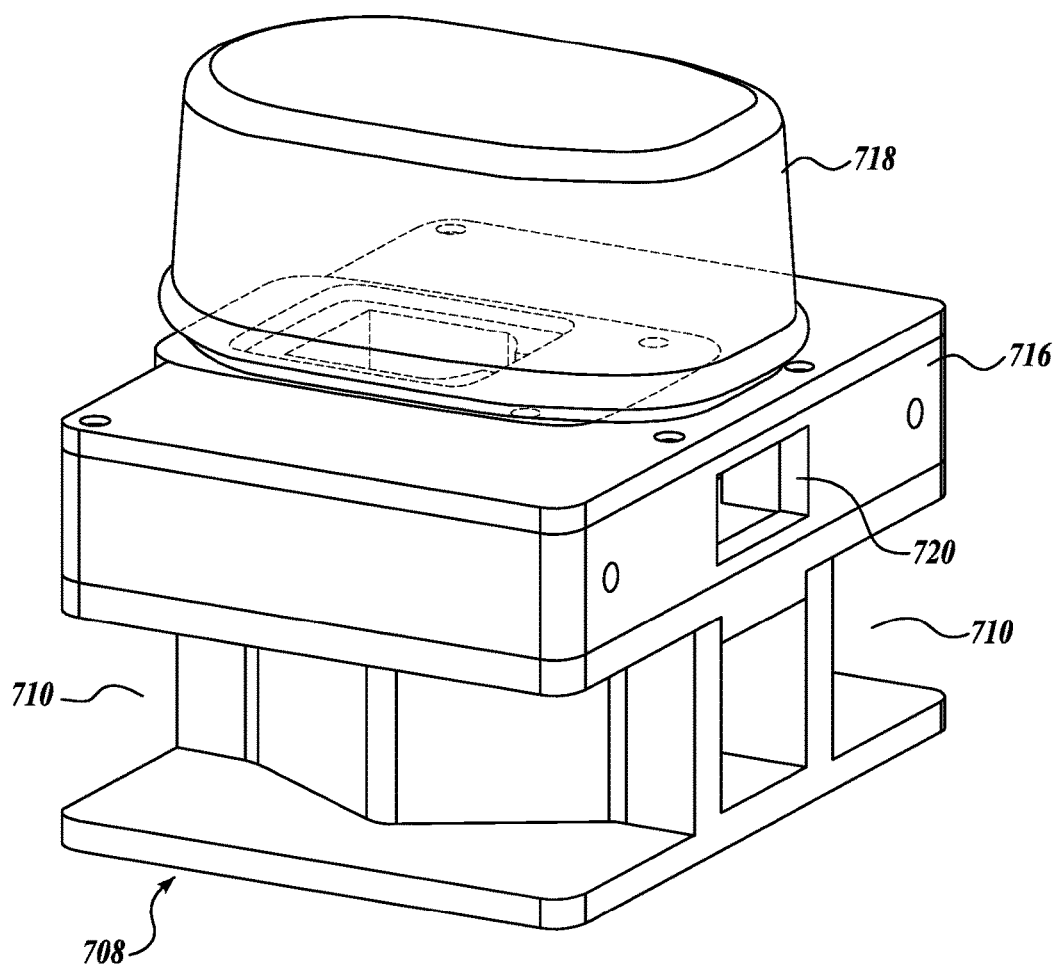
FIG. 11A is an enlarged perspective view of a component thereof.

With reference to FIG. 11, a multiple phalange-fingered gripper 700 can have two or more opposing fingers controlled by appropriate drives such as a differential drive providing for finger curling. Motors for the fingers 702 can be contained within a housing 704 supported on a wrist structure 706. The wrist structure can be mounted on a graspable housing 708 of the type shown in more detail in FIG. 11A. Such housing has elongated, side opening channels 710 configured for insertion of the jaws of a conventional gripper 712. Gripper 712 can, for example, be carried on an articulated arm mounted on a remote controlled mobile crawler. An electronics box 716 is mounted on the base 708, and a battery pack 718 can be mounted on the box. It is intended that the battery pack provide all power required for operation of the wrist joint 706 and the motors controlling the distal gripper fingers 702. Control signals are transmitted wirelessly from the proximate gripper 712 such as by a serial infrared data carrier (IR) or other wireless communication link. In FIG. 11, box 722 on the gripper 712 represents one transmit-receive component of the wireless interface, and window 720 into the electronics housing 716 represents the other. In addition to control signals for operation of the fingers, information regarding force, position, or operational status can be communicated back to the gripper platform via the IR or other wireless interface for display by an operator control unit associated with the gripper 712. This approach allows new capability to be added to an existing field robotic platform with no modifications for mechanical attachment and, in some cases, no modification to the software platform or electronics. In one implementation, the compliant, conformal, end-effector gripper accessory may be stored in a special purpose holster on the platform such that the operator may utilize the platform's existing end-effector for heavy lifting or in conjunction with the platform's existing tool set and may then pick up the conformal gripper from the holster storage location to perform tasks that require additional dexterity.

Figure 12:
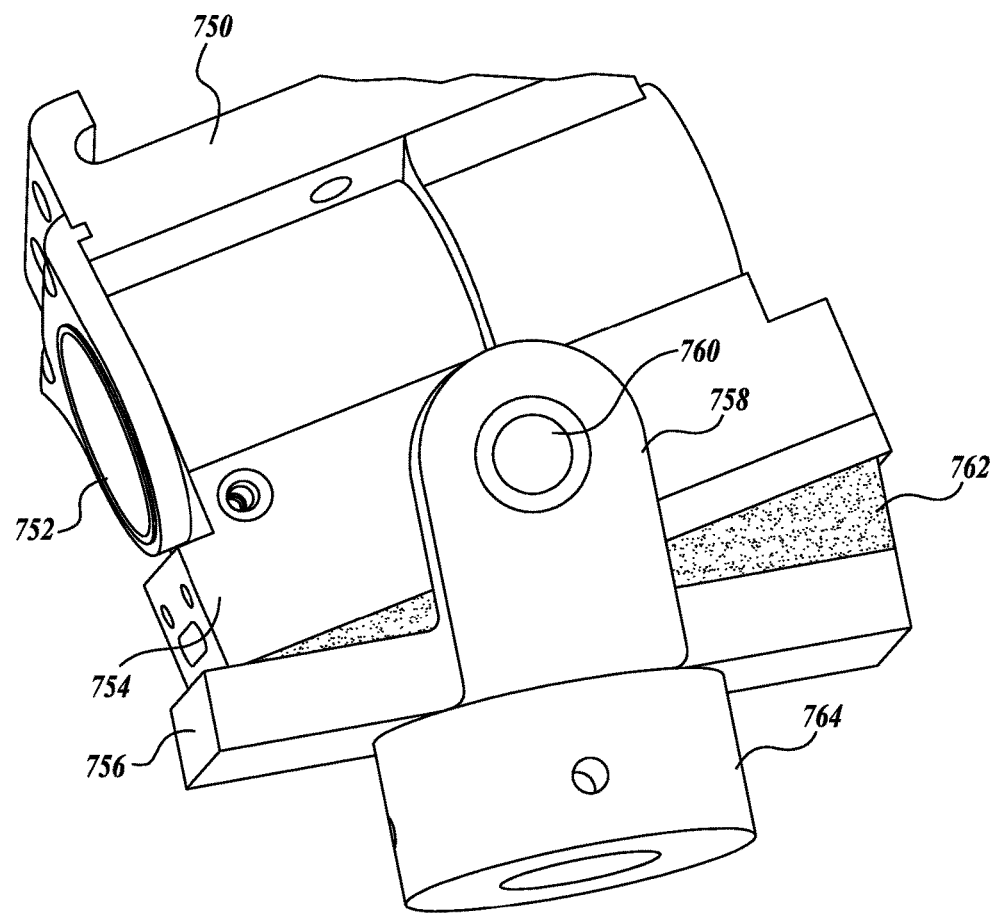
FIG. 12 is a diagrammatic perspective view of a compliant robotic wrist assembly in accordance with the present invention.

With reference to FIG. 12, in accordance with the present invention a resilient compliant element can be provided in a robotic wrist structure, particularly in an area that mimics the limited lateral deflection of a human wrist. A hand-like gripper can be connected to a mounting plate 750 which is swingable about the transverse axis of a pivot shaft or tube 752. The joint having the transverse axis is carried by a base plate or block 754 which is spaced from an adjacent plate 756. Clevis or hinges arms 758 project from the plate 756 beyond the plate 754 to a pivot shaft 760 that allows the limited swinging of plates 754, 756 relative to each other. A resilient compliant element 762 such as a pad of elastomeric material biases the two plates to a neutral, parallel position, but permits the limited lateral swinging against the biasing force of the block or other resilient resistive element. At the other side of plate (at the bottom of FIG. 12) a cylindrical connector 764 is provided for attachment to a rotatable robotic arm to provide for rotation about a longitudinal axis (upright as viewed in FIG. 12).

While illustrative embodiments have been illustrated and described, it will be appreciated that various changes can be made therein without departing from the spirit and scope of the invention.

The embodiments of the invention in which an exclusive property or privilege is claimed are defined as follows:

1. A robotic finger assembly, comprising:
    a plurality of robotic phalanges pivotally connected end-to-end;
    a first proximate phalange comprising:
        a pair of mounting plates;
        a first gear between the pair of mounting plates, wherein the first gear is configured to be connected to a driver motor;
        a pair of side rails removably connected to the pair of mounting plates at a distal end;
        a second gear between the pair of side rails, wherein the second gear is configured to mesh with the first gear; and
        a drive spool is axially coupled to the second gear; and
    a differential drive system comprising a tendon connecting the first proximate phalange to a second distal phalange, wherein the drive spool is connected to the tendon at the proximate end, and a distal end of the tendon is connected to the second distal phalange.

2. The robotic finger assembly of claim 1, further comprising an intermediate phalange pivotally coupled between the proximate and distal phalanges, wherein the middle phalange includes a spool connected to the tendon.

3. The robotic finger assembly of claim 1, wherein the first proximate phalange pivots at a proximate end and at a distal end.

4. The robotic finger assembly of claim 1, wherein the first proximate phalange is separable to separate the first gear from the combination of the second gear, the drive axle, and the differential drive system.

* * * * *